US010853342B2

(12) United States Patent
Kapoor et al.

(10) Patent No.: US 10,853,342 B2
(45) Date of Patent: Dec. 1, 2020

(54) APPARATUS, SYSTEM AND METHOD OF PRESENTING VIEWS OF A USER'S DATA USING SUMMARY TABLES

(71) Applicant: Apple Inc., Cupertino, CA (US)

(72) Inventors: Anukul Kapoor, Pittsburgh, PA (US); Edward P. Hogan, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 1352 days.

(21) Appl. No.: 14/750,704

(22) Filed: Jun. 25, 2015

(65) Prior Publication Data

US 2016/0378811 A1    Dec. 29, 2016

(51) Int. Cl.
*G06F 16/22* (2019.01)
*G06F 16/245* (2019.01)
*G06F 16/957* (2019.01)
*G06F 3/0488* (2013.01)

(52) U.S. Cl.
CPC ........ *G06F 16/2282* (2019.01); *G06F 3/0488* (2013.01); *G06F 16/245* (2019.01); *G06F 16/957* (2019.01)

(58) Field of Classification Search
CPC .... G06F 17/246; G06F 17/211; G06F 3/0488; G06F 16/957
See application file for complete search history.

(56) References Cited

U.S. PATENT DOCUMENTS

| | | | | |
|---|---|---|---|---|
| 5,950,168 A | * | 9/1999 | Simborg | G06Q 50/24 705/3 |
| 2006/0036955 A1 | * | 2/2006 | Baudisch | G06F 3/0481 715/747 |
| 2006/0117253 A1 | * | 6/2006 | Polash | G06F 40/103 715/247 |
| 2007/0050697 A1 | * | 3/2007 | Lewis-Bowen | G06F 17/246 715/212 |
| 2007/0078881 A1 | * | 4/2007 | Vignet | G06F 17/245 |
| 2014/0059485 A1 | | 2/2014 | Lehrian et al. | |

(Continued)

OTHER PUBLICATIONS

"League Table," http://www.premierleague.com/en-gb/matchday/league-table/, Retrieved Jun. 25, 2015.

(Continued)

*Primary Examiner* — Charles E Lu
(74) *Attorney, Agent, or Firm* — Fletcher Yoder PC

(57) ABSTRACT

An article, apparatus and methods are disclosed. The device and related methods involve a computing device including a program, such as a word processing program or spreadsheet program, configured to organize, through primary and other designations, table data and display, or otherwise use, the table of data. The program also provides a mechanism whereby by rows and columns may be prioritized for display, particularly on a relatively smaller mobile display. The prioritization(s) are then used by a device, whether the same or different than used to create provide the designations, to use the prioritizations to display the prioritized information, with other information being nested and displayable upon an interaction from a user, such as touching a displayed primary column cell to cause a secondary nested and related column cell to be displayed. In some instances, table designations occur automatically based on some attribute of the table or table data.

20 Claims, 10 Drawing Sheets

(56) References Cited

U.S. PATENT DOCUMENTS

2014/0157101 A1   6/2014  Hogan et al.
2015/0331846 A1*  11/2015 Guggilla ............. G06F 17/2705
                                                    704/9

OTHER PUBLICATIONS

"Numbers For iOS (iPad): Add and rearrange table rows and columns," https://support.apple.com/kb/PH14656?locale=en_US, Retrieved Apr. 7, 2015.
"How to add headers and footers to tables in Numbers on iPad," http://www.icreatemagazine.com/tips/how-to-add-headers-and-footers-to-tables-in-numbers-on-ipad/, Retrieved Apr. 7, 2015.

* cited by examiner

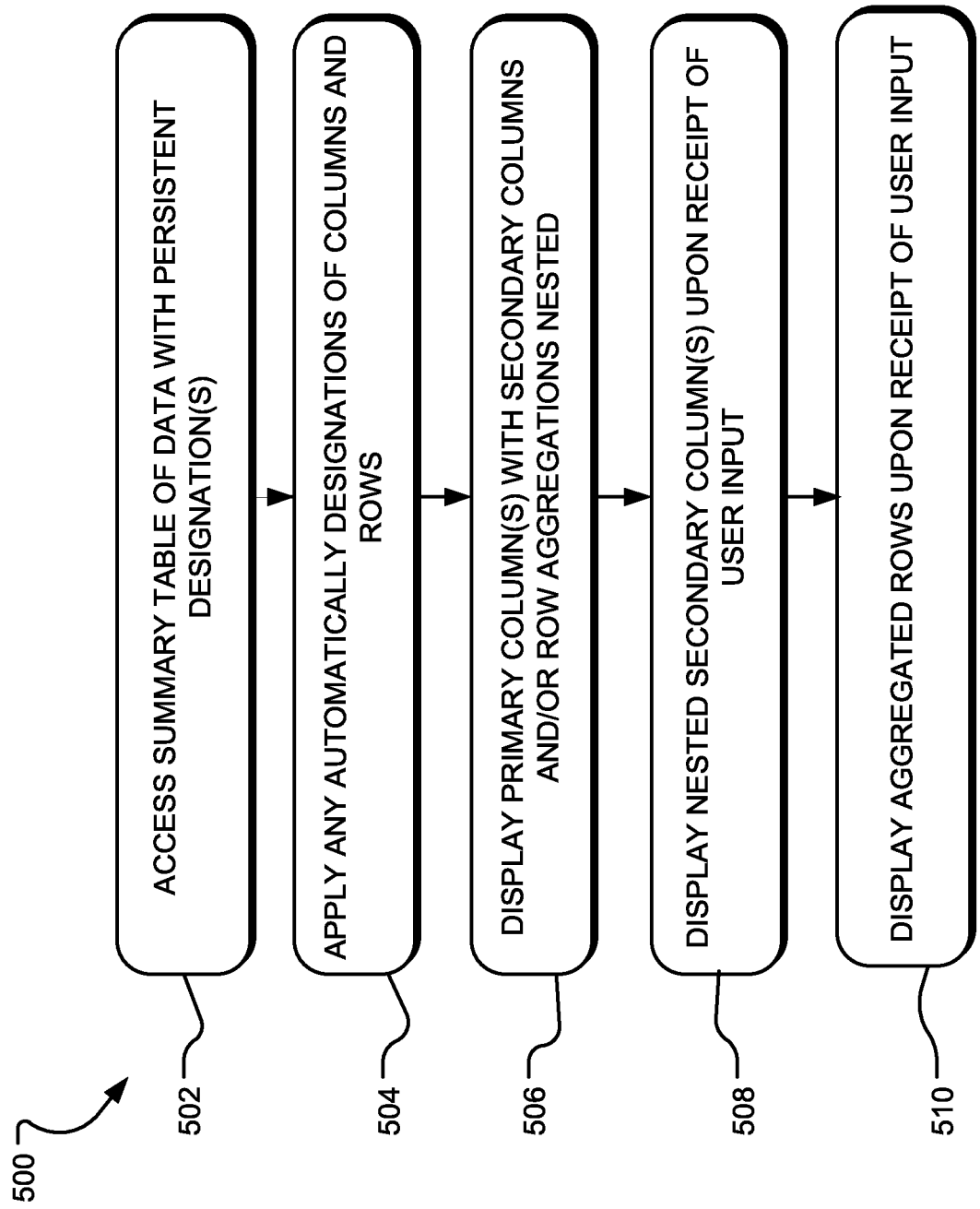

APPARATUS, SYSTEM AND METHOD OF PRESENTING VIEWS OF A USER'S DATA USING SUMMARY TABLES

FIELD

The described embodiments relate generally to organizing and displaying data for an electronic device. More particularly, the present embodiments relate to organizing table data and providing nested views of the organized table data for efficient display and interaction on an electronic device.

BACKGROUND

Tables of data often include numerous columns and rows of data that are not suitable for display across the field of view of a typical mobile device display. Moreover, such tables of data often include numerous columns of unimportant data or data used in computations to provide relatively more important data. In conventional mobile devices and some tablet settings with relatively smaller displays as compared with laptops and desktop computers, tables of data are often displayed in such a small form that a user cannot discern the data or might be displayed in a suitable size but with many data fields not being displayed or unimportant columns being displayed, and requiring a user to drag the data into view on the screen. Moreover, the arrangement of the table may not be suitable for viewing on a smaller screen as compared to the relatively larger screen where the table may have been originally created.

It is with these observations in mind, among others, that aspects of the present disclosure were conceived.

SUMMARY

Accordingly, there is a need for electronic devices with more efficient methods and interfaces for organizing and presenting a table of data. Such methods and interfaces optionally complement or replace conventional methods for organizing and presenting tables of data. Such methods, interfaces and data displays make the interaction with large amounts of data, particularly on relatively smaller displays of mobile devices, more efficient for the user and more intuitive, among other things, and provide a more efficient and intuitive human-machine interface. For battery-operated devices, such methods and interfaces conserve power and increase the time between battery charges. The above deficiencies and other problems associated with table displays for electronic devices, particularly those with touch-sensitive surfaces are reduced or eliminated by the disclosed devices.

Aspects of the present disclosure involve a computer implemented method of organizing table data. The method involves an electronic device including one or more processing units where the electronic device is in operable communication with a display and in operable communication with data storage. The method involves accessing a table of data from the at least one data storage where the table of data is organized as a plurality of rows and a plurality of columns including a first column and a second column, with a plurality of cells at each intersection of the plurality of rows and the plurality of columns. The method further involves generating a primary designation for at least the first column of the plurality of columns and persistently associating the primary designation with the at least one primary designated column in the table of data. The persistent primary designation prioritizes a display of the primary designated first column relative to at least the second column such that a plurality of cells of the primary column are initially displayed in a first view and the second column is nested in the first view for display in at least a second view. Finally, the method may further involve storing, in the at least one tangible, non-transitory, data storage, a summary table of data organized as the plurality of rows and the plurality of columns with the plurality cells corresponding to each intersection of the plurality of rows and with the plurality of columns, the summary table further including the primary designation of at least the first column.

Another aspect of the present disclosure involves a method of organizing table data in a computing device, such as a smart phone, tablet or watch, in operable communication with a display and in operable communication with at least one tangible, non-transitory, data storage. The method further involves accessing a summary table of data based on an original table where the summary table is organized as a plurality of rows and a plurality of columns including a first column and a second column, with a plurality cells corresponding to each intersection of one of the plurality of rows and one of the plurality of columns in each row of the plurality of rows. The summary table of data includes a persistent primary designation of at least the first column. The persistent primary designation prioritizes a display of the primary designated first column. The method further involves displaying the summary table including displaying the primary designated first column of the table of data. The displayed at least first column includes a plurality of intersecting rows, each of the plurality of rows including a displayed first cell of the first column and an undisplayed nested second cell of the second column. The displayed summary table includes a user interface feature to cause the display of the nested second cell of the second column.

Another aspect of the present disclosure may involve an apparatus, such as mobile device in the form of a smart phone, tablet or watch, including a computing device with a touchscreen display, the computing device including at least one processor in operable communication with at least one tangible, non-transitory, memory including computer executable instructions where the computer executable instructions are to access a summary table of data based on an original table. The summary table is organized as a plurality of rows and a plurality of columns including a first column and a second column, with a plurality cells corresponding to each intersection of one of the plurality of rows and one of the plurality of columns in each row of the plurality of rows. The summary table of data includes a persistent primary designation of at least the first column where the persistent primary designation prioritizes a display of the primary designated first column. The apparatus, through the instructions, further displays the summary table including displaying the primary designated first column of the table of data where the displayed at least first column includes a plurality of intersecting rows. Each of the plurality of rows includes a displayed first cell of the first column and an undisplayed nested second cell of the second column. The displayed summary table further includes a user interface feature to cause the display of the nested second cell of the second column.

BRIEF DESCRIPTION OF THE DRAWINGS

The disclosure will be readily understood by the following detailed description in conjunction with the accompanying drawings, wherein like reference numerals designate like structural elements, and in which:

FIG. 5 is a flowchart of a method of displaying a summary table of data in accordance with some embodiments.

DETAILED DESCRIPTION

Figure 1:
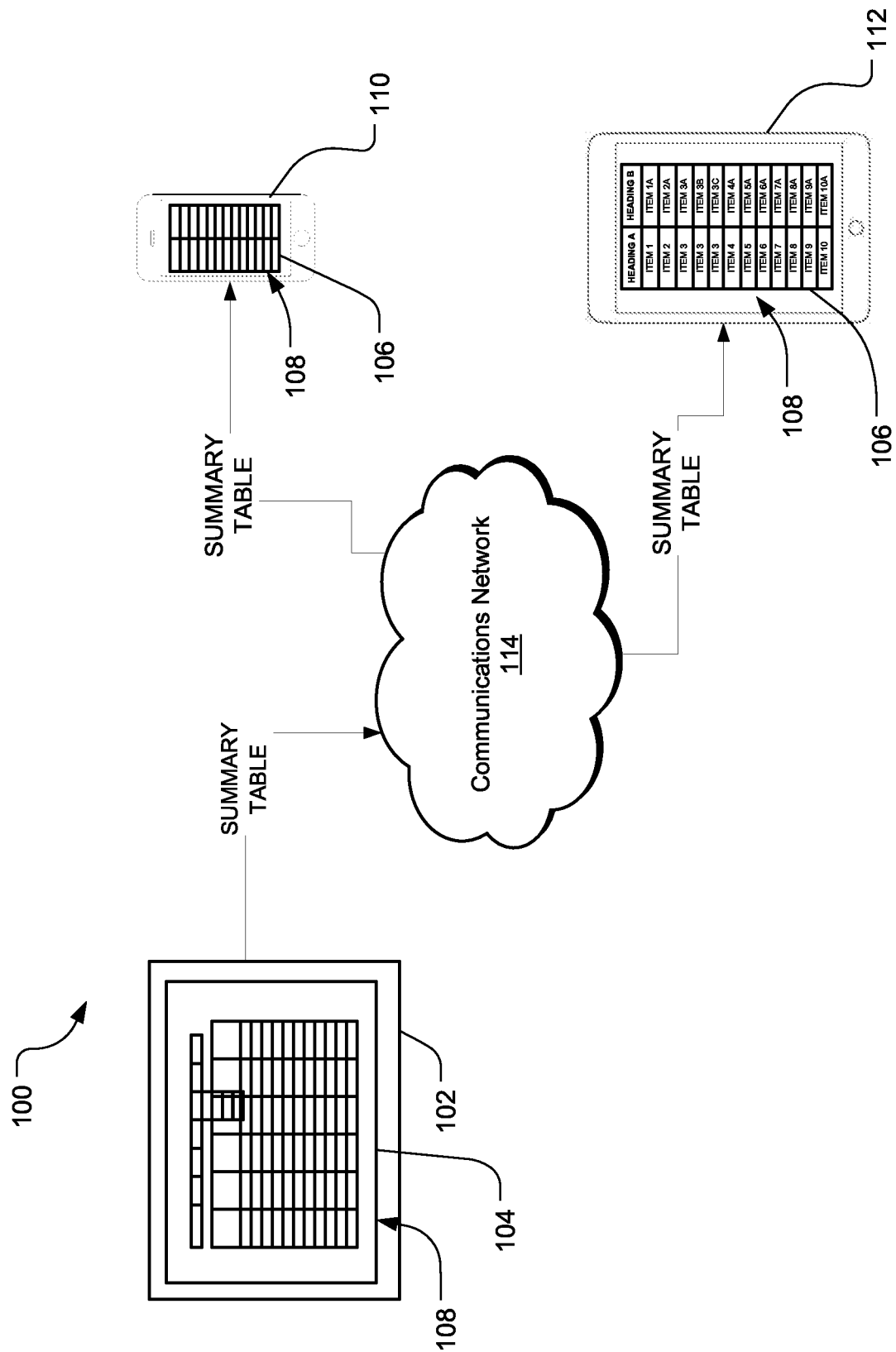
FIG. 1 is a system diagram in accordance with some embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Aspects of the present disclosure involve organizing and designating certain fields or columns of table data for display in various tiers or nested views such that the table data is more readily consumable in mobile displays, whether smart phone or watch, or other relatively smaller displays such as those associated with some tablets. In one particular implementation, an input is received from a user that designates one or more columns of data, in the table, as a primary column (also referred to herein as a "favorite") or otherwise identifies one or more columns to prioritize and identify the column (or columns) for special display treatment or other type of specialized display treatment. The primary designation, as well as other designations, may be persistently associated with the column in the stored table of data. So, for example, the stored table of data includes the designation thereby by allowing subsequent access of the table to use the designation in display or other action upon the table. In some instances, any remaining or additional columns of data (e.g. those not designated as primary) are of secondary status. The secondary designation may also be persistently associated with the other columns or may be a default designation or implicit designation due to the lack of having a primary designation. In yet another alternative, a user may actively provide an input to designate some or all additional columns as secondary. Implementations may allow for tertiary and other designations of columns either implicitly or actively in the same or similar manner.

Aspects of the present disclosure further allow a user to associate or otherwise aggregate rows of data. In some instances, any data fields of the primary column with a common attribute or otherwise of the same type may be automatically associated, and the associated rows aggregated in a single row of a displayed primary column where a cell or cells of the aggregated row show an instance or instances of the same type upon which the association was based. The row aggregation may also occur for the primary, secondary, tertiary or other columns, depending on the implementation, user preferences or selections, and other factors.

While this application uses the terms "primary," "secondary," "tertiary" and the like, such terms are not meant to be limiting but merely indicative of the display priorities and organization of any given user defining a table for display. A given implementation conforming with the aspects of the disclosure may reference other terms—e.g., "favorite"—in the designation of rows and columns for display, nesting, aggregation and other processing or use of the table data.

When a program, app or other data processing environment operating on some form of computing device (collectively referred to herein as a "program") accesses the table of data for display, the program will recognize the primary and other designations of the data and display the table accordingly. In some instances, the program is aware of its display environment and/or computing device constraints (e.g., a type of mobile device it is running on versus running on a desktop computer) and applies the designations appropriately, which may be achieved automatically or through one or more user selections or inputs. So, for example, if three columns, of a total of 10 columns of data in a table, are designated as primary, only the three designated columns of data are initially displayed. Hence, the program automatically recognizes the designations and displays the table with column or row designations (also referred to herein as a "summary table") in a format more suited to the display constraints in the mobile environment. In this example, three columns may be more suitable for the screen size than the original 10 columns. The primary columns are formatted to proportionally fit the screen on which the summary table is being displayed, in one instance.

While the disclosed systems and methods are perfectly suitable for displaying and organizing data for display on relatively larger displays of laptop or desktop displays, presentation through projection systems or otherwise, the system is particularly suitable for displaying large otherwise cumbersome tables of information in mobile computing environments with more constrained display attributes. Referring to a displayed summary table integrating one or more of the user selected designations, when a user selects a row of the displayed primary designated column, the additional secondary rows of the non-primary (e.g., secondary) columns may be displayed. In such a way, the secondary data, which is initially not displayed, is then displayed in a tiered or nested secondary display form. Additionally or alternatively, by selecting a row of the primary column(s) or by further selecting the secondary data, any linked or aggregated row data may further be displayed, in a display nest. So, generally speaking, different portions of the original table processed as a summary table may be progressively revealed through the designated columns and/or rows, with each progressive revelation formatted for the display environment and visually linked to the preceding displayed data to which it is related. As will be understood from the description, secondary column designations, row aggregation and other forms of display prioritization and nesting, are not limited to any particular order and the system may automatically or a user may manually (or a combination thereof) designate columns and rows based on the characteristics of the table and other factors. In this manner, a table with large amounts of data may be displayed on a computing device with a constrained display based on or more preferences or selections of a user of the table.

FIGS. 1 and 6-8 provide a description of exemplary devices. FIGS. 2 and 4A-4C illustrate exemplary user interfaces for creating, displaying and interacting with a summary of table data, each also illustrating exemplary devices. FIGS. 3 and 5 are flow diagrams illustrating a method of generating, either automatically or based on user interaction, column and/or row designations of a table of data, and providing displayed summary table of the primary designated table information (e.g., primary columns) and nested information (e.g., secondary columns or row aggregations). The user interfaces are used to illustrate the processes in FIGS. 3 and 5, and the devices of FIGS. 7 and 8 include processing units configured to carry out the operations illustrated in FIGS. 3 and 5.

FIG. 1 is a diagram depicting a computing environment 100 where aspects of the present disclosure may operate and may be implemented. It should be recognized that the environment of FIG. 1 is but one possible environment and simplified to better depict aspects of the present disclosure without unnecessarily obscuring the concepts. In FIG. 1, a user at a desktop computer 102 creates a table 104 (original table) with a number of cells of data arranged in rows and columns. The table of data may be a spreadsheet in an accounting program, a table in a word processing program, or any number of different possible ways to create and present a table of data. Any table of data may have any number of possible columns and rows, with each column and row generally describing some type of information with each cell at the intersection of a row and column having an attribute, such as a data value, particular to the intersected row and column. The present disclosure is described with reference to table data where there are two or more columns and two or more rows of data. Further, the present application is described relative to a common table format where each column has data values of the same kind (or same class) for each row of the table. For example, a "time of day" column would list in each row of the column the same type of data value (time of day) in the same format—e.g., hour:min or hour:min.sec—although not necessarily the same value. In most cases, each row of the table provides a related or associated set of data values for each interested column.

The device 102 may include computers that are generally portable (such as laptop or notebook computers) as well as computers that are generally used in one place (such as conventional desktop computers, workstations and/or servers). In certain embodiments, the electronic device in the form of a computer may be a model of a MacBook®, MacBook® Pro, MacBook Air®, IMac®, Mac® mini, or Mac Pro® available from Apple Inc.

In a common table example, a simple household expenses spreadsheet may have a row for each kind of expense (car payment, mortgage, credit card, etc.). Here, the first column of the table may include a heading of "expense" and be followed by three columns for an expense amount, a due date, and a total amount paid to date, respectively. In this example, each data element in a row at columns two and three is related by the kind of expense (car payment, mortgage, etc.) designated in the first column. In this example, the first column and the second column may be designated by a header if the table is being built in Numbers® by Apple Inc. of Cupertino, Calif. In this simple example, a user may designate the first two columns as primary such that an associated summary table would display the expense type and the amount. In one possible implementation, the header designation would cause an automatic primary designation for the column absent a user input, with the other two columns being designated secondary. In such an implementation, selecting a row of the primary columns in the summary table, would cause the related secondary column to be displayed in a new row adjacent the selected row. In another example, a table describing an electronic collection of music may be stored or presented in table form with a column for album names, a column for the year of the album, a column for each track name of an album (arranged by album name), and many other columns providing information about the album or track (e.g., release date, label, length of track, etc.). These examples are provided merely to provide examples of the sorts of table data that might be displayed and various aspects of the disclosure; however, the use of these examples does not imply that this disclosure is in any way limited to these examples.

For ease of reference and discussion, this application is described with respect to a table format where there are a plurality of unique columns and rows. Moreover, the columns are illustrated as being vertically arranged and the rows being horizontally arranged. The reference to a column or a row as used herein, however, is meant to refer to the characteristic of the relationship between the data or attributes of any cell (intersection between a row and column) and the column and row designations and the later use of such designations in the display or other processing of the table, and not to whether it is presented horizontally or vertically, or in some other way. Accordingly, the reference to a column or a row should not be construed to imply any horizontal or vertical arrangement of the table. Indeed, a column might be displayed horizontally and a row displayed vertically.

A user, through aspects of the present disclosure, may define or otherwise customize the table of data for display in different forms than the originating table 104. For purposes of discussion, a table displayed or otherwise presented (such as through projection or printing) based upon primary or other designations of a column or columns of the originating table may be referred to herein as a "summary" table 106. The term, summary table, is meant to refer to a table of data that includes column and/or row designations that affect the display of the table or cause other actions by a program accessing the summary table, and which designations may determine data or attributes from the originating table to present or otherwise alter the programmatic interaction with the summary table as compared to the originating table. In this example, the user initially interacts with the table of data by way of the desktop computer 102 where some or most of the table data may be displayed. In this setting, the user may provide inputs through the computer to designate columns and/or rows of data as primary (favorite) or other possible designations through a graphical user interface 108, which may be a part of a word processing program, spreadsheet program or otherwise. In some implementations, one or more designations may be automatically applied based on their position in the table, based on similar or the same attributes or based on other characteristics. Once provided, some or all of the designations are persistently associated with the data.

In the same or some other computing environment, the table of data is accessed for display or some other form of presentation. In the examples illustrated herein, a user at a mobile (smart) phone 110 or another user at a tablet 112 access the summary table data. The user may access the summary table data in any number of a myriad of possible ways. For example, the user may receive an email over a communication network 114 with the summary table as an attachment, may select the table from a displayed icon on a desktop, may select the table from a file system menu, may search for and open the table from an application intended to provide access to the table, and other means. The table may also be stored at a server, such as in a cloud, and retrieved. In another example, the summary table may be locally stored and the user selects the table, which in turn launches a program to display the table. Of course, if the summary table (or file for the table) is selected directly, an extension or other identifier associated with the summary table may be used by the device to cause the launch of the correct application for displaying the table. The program may also allow the user to edit or otherwise interact with the data to alter the table, and the like. Regardless, the program on the device (110, 112) includes non-transitory computer executable instructions, which may be integrated with the program or accessed by the program, that recognize the column and/or row designations. In some instances, the instructions may be further configured to automatically generate further designations based on some initial (e.g., primary) designation, which may itself be automatically designated. Regardless, display of the summary table is based on the designations, some or all of which are persistently associated with the data.

Referring again to the music collection example introduced above, the user may identify the album name column and the year of release column as primary columns. The designation may be made through any number of possible means including through a drop down menu item, a radio button to designation a highlight column as a primary (or favorite column), hot keys, and voice recognition, to name a few. Regardless of the mechanism by which a column receives a designation, that designation is associated with the column. At the tablet 112, for example, the program accessing the summary table data recognizes the designation and displays the table 106 accordingly. Returning again to the music example, only the album name column and the year of release would be shown, at least initially. The relatively smaller display screen of the tablet or mobile device, then initially displays the likely most interesting or relevant data to the user—album name and album year—as designated by the same or a different user in the original table data 104.

Figure 2:
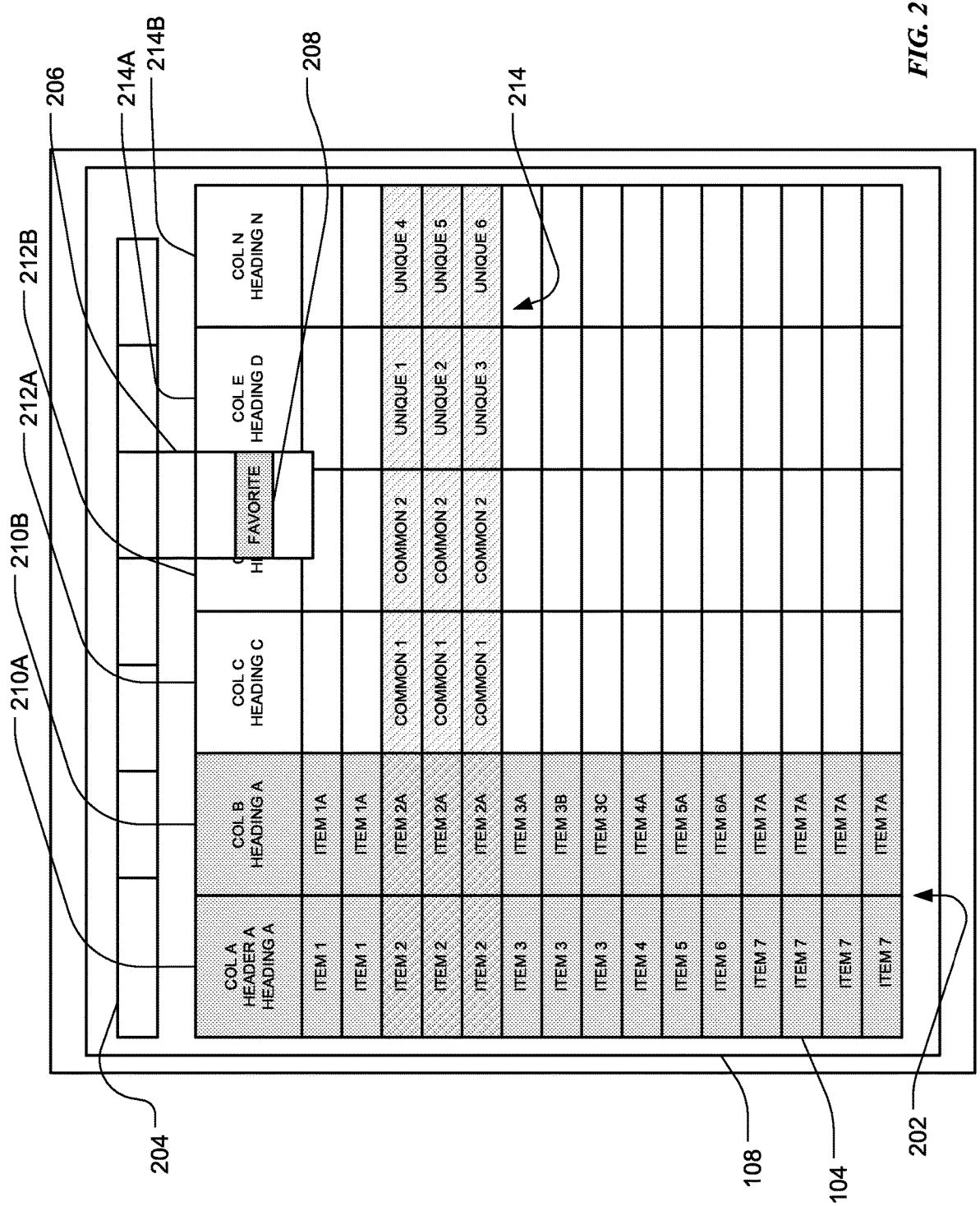
FIG. 2 is a display of a user interface and an original table of data including features for providing column and/or row designations in accordance with some embodiments.
Figure 3:
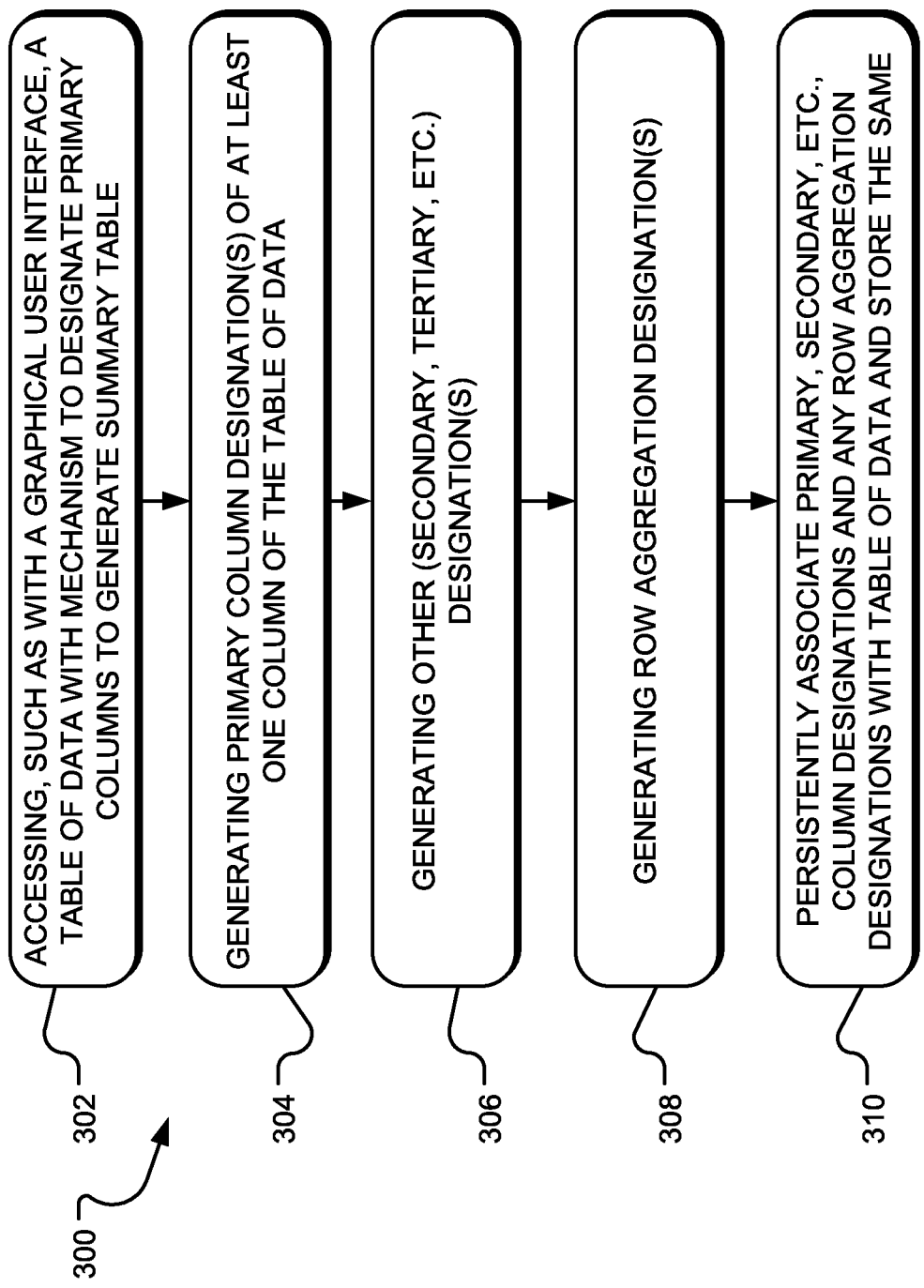
FIG. 3 is a flowchart of a method of providing column and/or row designations to a table of data to generate a summary table, in accordance with some embodiments.

Referring to FIG. 2, one example user interface 108 is illustrated where a user may designate one or more columns as primary (here identified as "favorite."). Referring now also to the flowchart 300 of FIG. 3, a method for generating a summary table with primary and other designations is shown. In this example, the user has highlighted 202 the first two columns (COL A and COL B) of an original table of data 104. In this example, the first column is also identified as a "header" column, and the first two columns include labels identified as Heading A and Heading B. In an implementation based on the Numbers® platform, some columns may be designated as header columns. In one possible implementation, columns with a header designation may be automatically further designated, by the program, as primary columns even absent an input or other indication by a user. A user, in such an implementation, may then further designate other columns as primary, or may override the primary designation of the header column or columns. In the example of FIG. 2, the user interface includes a menu bar 204 from which a drop down menu 206 including a "FAVORITE" selection 208 is illustrated. Accordingly, a table of data is graphically presented with a mechanism to designate primary columns (operation 302). In this example, by highlighting the two columns of data, and selecting "FAVORITE," the user creates a persistent primary designation for the first two columns 210A, 210B in this table (operation 304). If the header column was automatically designated, then the user would only highlight the second column and select FAVORITE from the drop down menu. The primary, secondary, and other designations are persistently associated with the table data and the table is stored (operation 310). In some instance, however, various designations are automatically generated depending on various relationships between the data (e.g., header columns, commonality or uniqueness of data) and such designations may be applied at the device using the data and hence may not be persistently stored with the data.

Figure 4A:
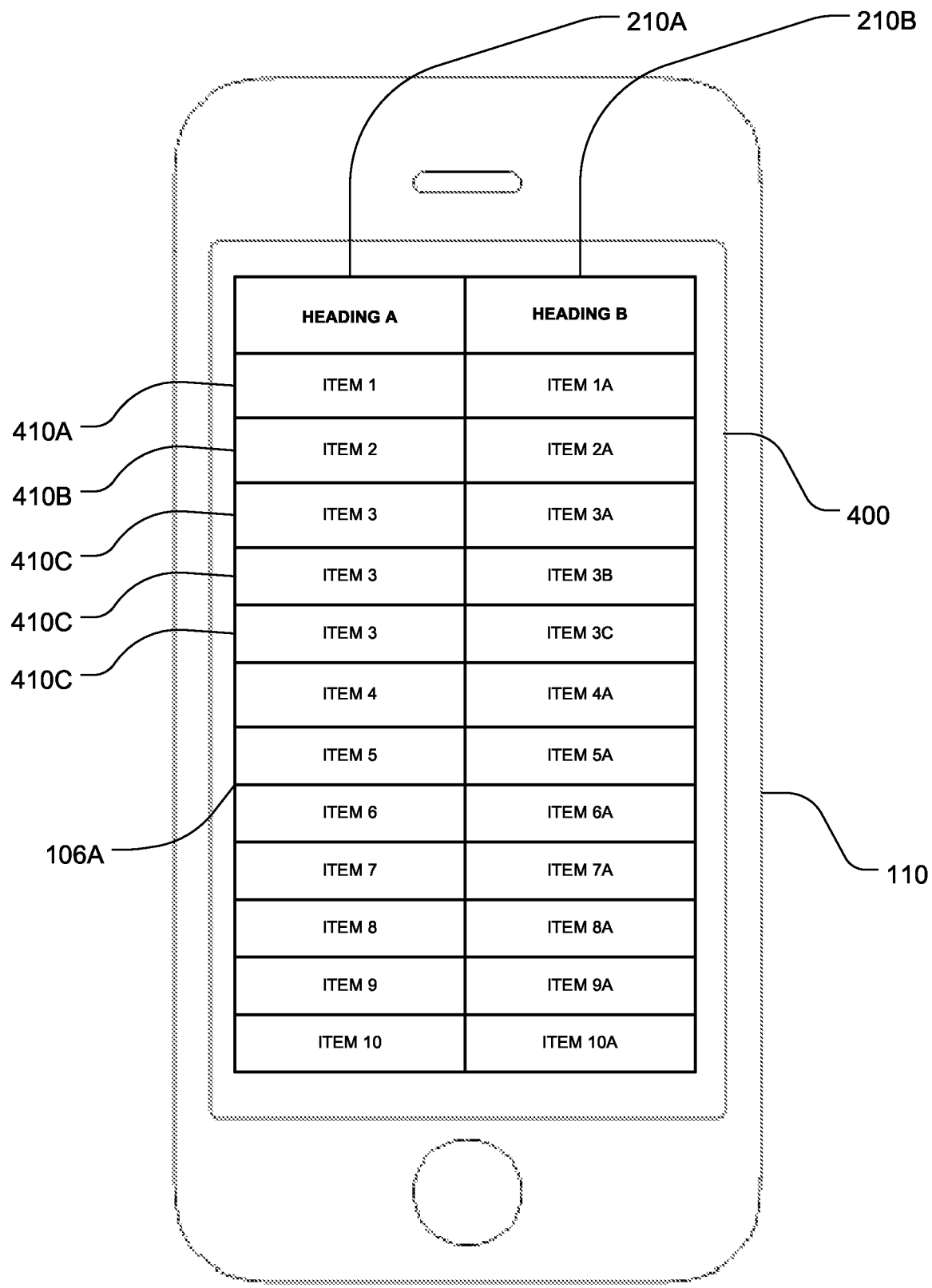
FIG. 4A is an example of a summary table displayed on a display of a mobile of device in accordance with some embodiments, the displayed summary table illustrating primary designated columns of the original table of data and nested information in accordance with some embodiments.

FIG. 4A illustrates a mobile device 110, in this case a smart phone, with a display 400, which may be a touch-screen display. FIG. 5 is a flowchart 500 illustrating a method of displaying a table of data using a summary table. A program first accesses a summary table with some form of persistent column designations and/or accesses a table and automatically applies any column designations based on some attribute of the table (e.g., a header) (operations 502 and 504). On the display, the summary table 106A is displayed based on the primary designation(s) and with any secondary, etc., or row aggregations nested (operation 506). As shown, the summary table includes the first two column headings (Heading A and Heading B) from the original table 104 and also includes twelve rows of data for the two primary designated columns 210A, 210B. As illustrated, only the first two columns of data are shown and they are formatted to fit the display accordingly.

Figure 4B:
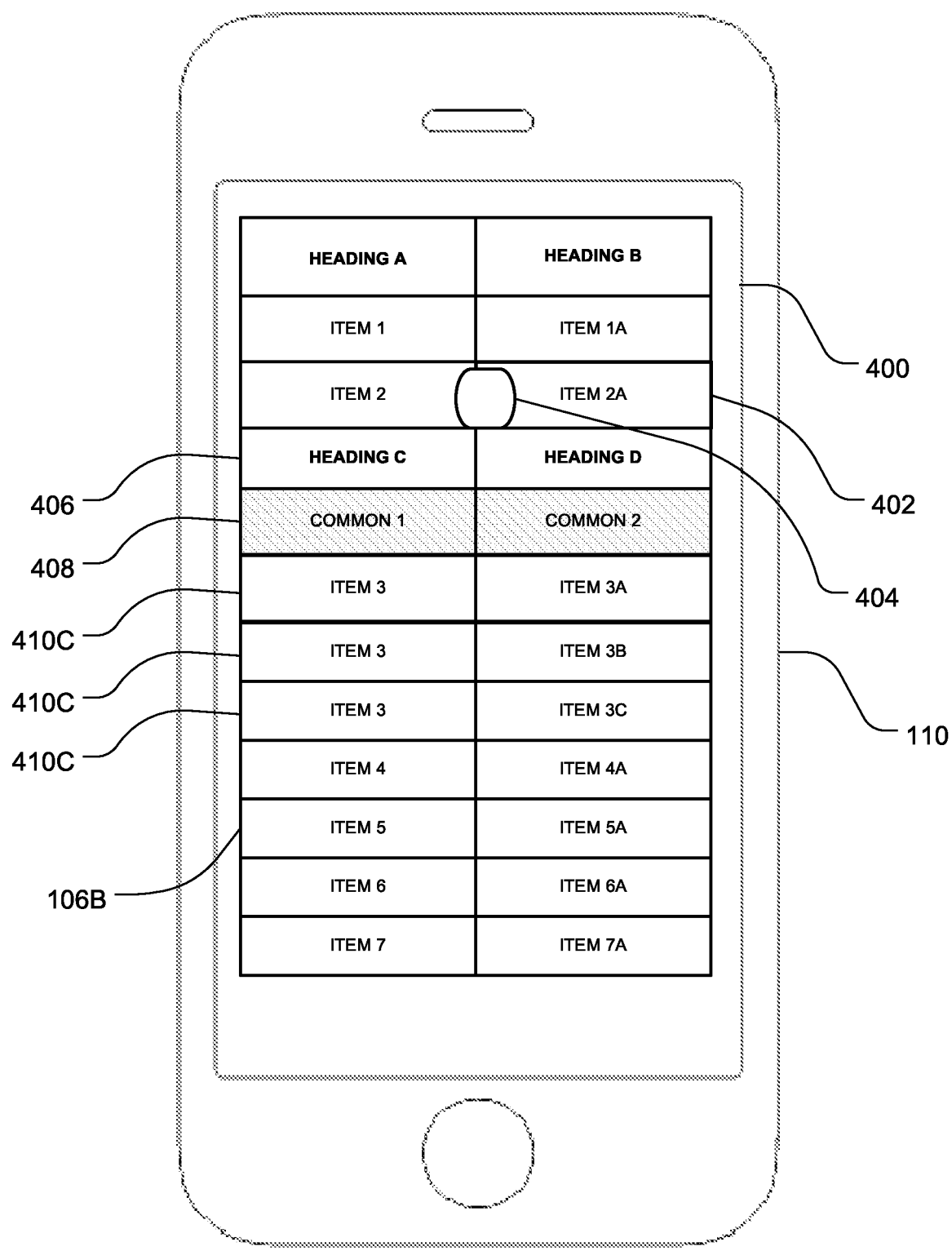
FIG. 4B is an example of the summary table of FIG. 4A with nested secondary column data displayed for one of the rows of the primary designated columns, and with further nested information in accordance with some embodiments.

As with primary designations, the system also allows the user to designate secondary columns or other designations (operation 306). FIG. 4B illustrates the summary table 106B after the second row 402 has been selected by the user, such as by touching any part of the row if displayed on a touch screen, selecting with a mouse pointer, etc. In this case, the diagram depicts a location 404 where a user has touched a portion of the second row 402. Upon selecting the row, secondary information for the selected row is illustrated (FIG. 5, operation 508). Referring again to FIG. 2, the third and fourth columns (212A, 212B) are designated as secondary. To provide such a designation, a drop down menu with a "secondary" designation (not shown) element may be provided—in the same general form as described with respect to the "favorite" selection 208 and menu 206. Alternatively, the non-primary designated columns may automatically be recognized as secondary. Further, the non-primary designated columns may automatically be recognized as secondary or provided some other additional or different designations based on whether the attributes of the rows associated with the primary data are common or unique. Regardless, returning again to FIG. 4B, the secondary information includes the headings 406 (Heading C and Heading D) for the secondary columns (212A, 212B). The secondary information also includes row data 408 related to the selected second row of the primary columns also includes the second row data, from the original table, for the secondary columns.

The system may also allow for row aggregation (FIG. 3, operation 308), which may be based on commonality of the type of data in the fields. Referring again to FIG. 2, in column A (210A), item 1 is common to the first two rows, item 2 is common to the third through fifth rows, etc. In such a situation, the program may automatically aggregate the rows based on the commonality of the row attributes—e.g., item 1, item 2. A common attribute is one that has the same value as another attribute. For example, item 1 may be the name of an album or name of an artist, and the album name or artist name would be the same in column A of the first two rows. Row aggregation may be limited to only the primary column or columns, as well. It is also possible, through a drop down menu for the user to enable row aggregation through a drop down menu like the FAVORITE designation. In such an implementation, the user selects "ROW AGGREGATION" or something similar for any selected column. Similarly, the user may select "ROW AGGREGATION" or something similar for highlight rows. Row aggregation may be based on an attribute of adjacent rows, in the same column designated for row aggregation, being the same. For example, the original table may have one or more rows for the same album, corresponding to the number of different songs for the album, and the user may aggregate the album name column causing all rows of a particular album to be nested into one row of the summary table.

In the original table example shown in FIG. 2, the second column 210B (COL B) has common attributes in the rows synchronously with the first column 210A (COL A), with the exception of the three rows where the common item (ITEM 3) is shown in the cells of the COL A and where there are three unique data elements in the respective three cells of the second column (ITEM 3A, ITEM 3B, and ITEM 3C). Referring again to FIG. 4, in this example, with row aggregation enabled for the first primary column 210A but with the second column also designated as primary but without row aggregation, the two rows (of the original table 104) with ITEM 1 and ITEM 1A in the two primary columns are aggregated into one row 410A, the three rows with ITEM 2 and ITEM 2A in the two primary columns are aggregated into one row 410B. However, because of the unique fields of the second column of the three ITEM 3 rows of the original table 104, each ITEM 3 (410C) row of the summary table is displayed. Hence, the primary column designation overrides and has priority over the row aggregation. It is possible, however, to provide other priorities. For example, row aggregation applied to a column may override a primary column without row aggregation enabled, in which case only the first row (or a different row) of ITEM 3 might be displayed, for example. Alternatively or additionally, the ITEM 3 rows and the second data field associated with the second column 210B may be grayed, blurred or otherwise provided with some form of display indicia indicating that different values are nested, which would prompt the user with a visual queue to select the row in order to view the additional rows and associated unique data fields. For example, referring to FIG. 4A, instead of three rows beginning with ITEM 3 in the first cell (of the first column), there would be one row and the value of the second cell (from the second column) would be grayed, providing a visual indication that more than one value was nested and selection of the cell would display the three nested data value. In such an implementation, the row aggregation causes a nesting of some of the rows of primary designated columns but not all of the rows. Regardless, and referring again to FIG. 5, the program may display aggregated rows (operation 510) such as through a user selecting a row that is an aggregated representation of a plurality of rows.

Referring again to FIG. 4A, it can be seen that item 1 and item 1A are listed in the two cells of the first row 410A, and item 2 and item 2A are listed in the two cells of the second row, and so on, because of row aggregation applied to the original table. This example shows the case where row aggregation is applied to the first column or the first two columns, and hence a single row is illustrated for the two rows from the original table with ITEM 1, and one row is shown for the three rows from the original table with ITEM 2, etc. If row aggregation were not enabled or implemented, the summary table would include two rows for item 1, three rows for item 2, etc.

Referring again to FIG. 2, the data elements or attributes of rows three through five of the third and fourth columns 212A, 212B (COL C and COL D), each have common attributes designated "COMMON 1" and "COMMON 2," meaning the entries in each of the cells marked COMMON 1 are the same and the entries in each of the cells marked COMMON 2 are the same. So, for example, if the third column 212A referenced the highest chart ranking for the album and the fourth column 212B referenced the label for the album, then the entries for each of the rows for the ITEM 2 album would have common entries (COMMON 1 and COMMON 2) for the ranking and the label. Columns E and N, in this example, have unique attributes 214. So, for example, if COL E referenced the name of a track on the album identified in COL A, then there would be three different track name entries for UNIQUE 1-3 referring to the three tracks identified. If COL N referenced the length of the associated track, then UNIQUE 4-6 would include unique time values for each of the three listed tracks (UNIQUE 1-3).

If automatic designations were occurring, then the columns with common information may be automatically designated as secondary to the rows associated with the common attributes. Similarly, if automatic designations were occurring, then the columns with unique information or attributes might be designated as tertiary to the rows associated with the common attributes. In the example of FIG. 2, the fifth and Nth columns have unique attributes. Upon detection of these unique attributes, the fifth and Nth columns (214A, 214B) may be provided a special designation, such as a tertiary designation, and automatically linked to the rows to which the unique data is associated. The link to the row may be done implicitly due to the unique attribute falling in the row to which it is associated, or may be more directly associated through the table data. Referring again to the example of a table of music, if the unique designation is for the length of a particular track of an album, then that track length (unique attribute) remains associated with the unique track name (also unique attribute).

Referring again to FIG. 4B and FIG. 5, it can be seen that the secondary data as designated in the original table data is displayed when the user selects the second row 402 (operation 508). Here, the column headings (HEADING C and HEADING D) for the third and fourth columns are displayed in a row 406 immediately adjacent the selected second row 402, and then a row 408 of secondary data related to the second row 402 is shown adjacent the secondary column designations 406. In the example illustrated, the secondary column and row data is shown below the selected row 402, with the third primary row 410C and following rows immediately below the secondary information, it is also possible to display the secondary row information above the selected row, or to show the secondary information above or below, depending on the position of the selected row on the screen and whether the secondary information will be visible after display, or to display the nested secondary information in some other way.

Figure 4C:
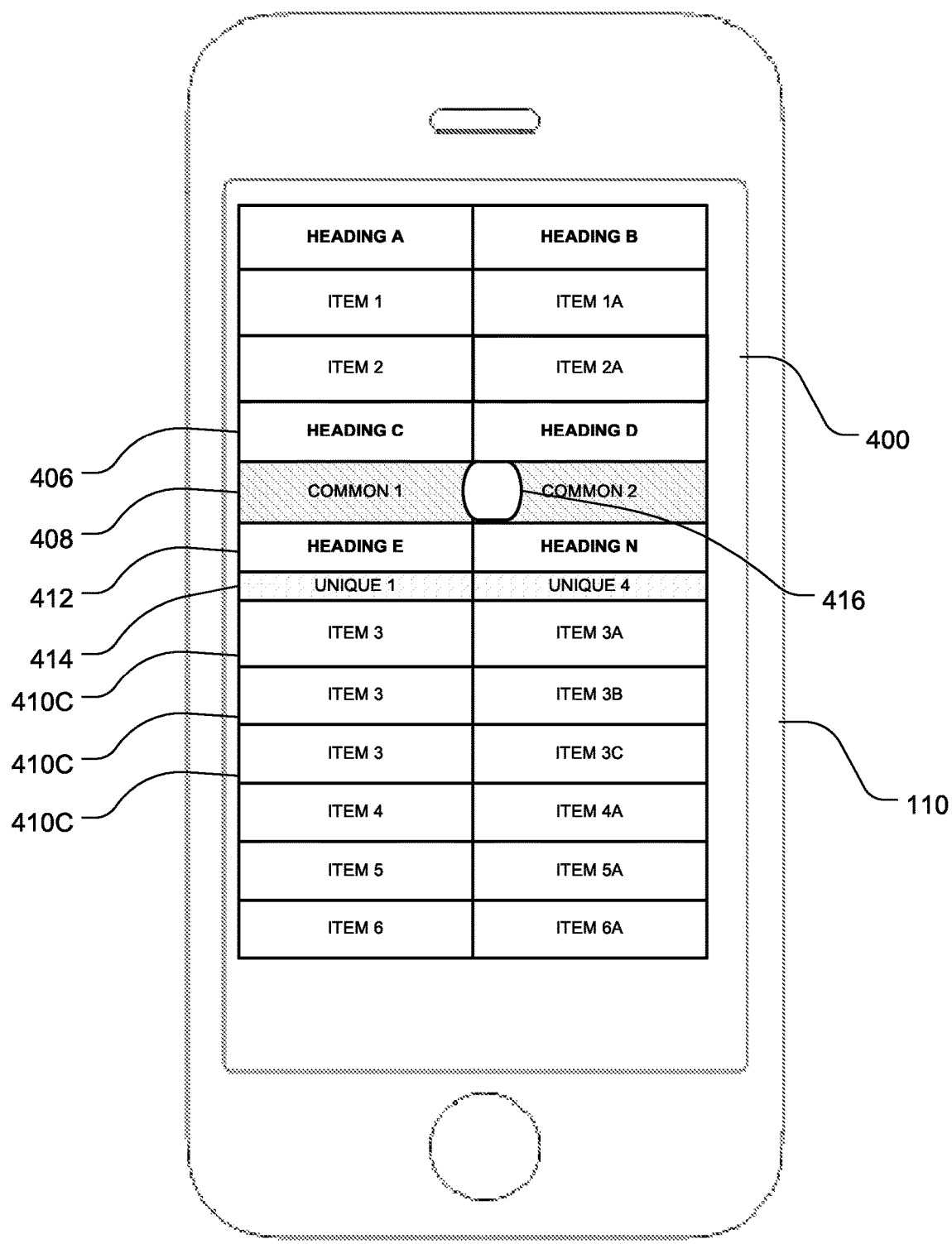
FIG. 4C is an example of the summary table of FIG. 4C with the further nested information displayed in accordance with some embodiments.

Referring to FIG. 4C, similarly to the secondary data, when the user selects the secondary row 408, tertiary data is then displayed in an adjacent row to either the primary row or the secondary row, with the original rows shifted appropriately. In the illustrated example, the nested tertiary data is displayed in a tertiary row 414 below the secondary row with the headings (HEADING E and HEADING N) in a row 412 immediately below the secondary row 408, with the original and adjacent primary rows (e.g., row 410C) shifted downward. It would also be possible, to provide the tertiary row between the primary and secondary rows, or display the tertiary row above the primary row and shift the original data upward. In this example, the nested tertiary data is displayed based on a user touching the touch sensitive display 400 at location 416 where the secondary row 408 is displayed.

The summary table display in the present examples of FIGS. 4A-4C, maintains the initial two column designations and the overall same table dimensions relative to the display size, throughout the revealing of the nested secondary data and tertiary data. It is also possible to provide other forms of display or customization of the display. For example, if there are two columns of primary data and four columns of secondary data, the secondary data may be provided in two consecutive nests with the user first selecting the primary row to cause the display of the first two columns of secondary data rows and secondly selecting a first secondary row to cause the display of a second secondary row with the third and fourth columns of secondary data for the same row of the original table. So, the system may take into account the number of primary columns and the display of the same in the determination of how to display secondary columns. For example, the display formatting for the primary columns may establish the overall format for the secondary display, and the secondary columns will be nested, scaled and/or formatted appropriately. If there are two columns of primary data and four columns of secondary data, then the secondary columns may be nested in two sets of two columns of the same dimension as the primary columns. Five secondary columns might be nested in two nests of two columns, and one nest of one column, in another example.

It is also possible, to provide for customization of the views of the nested secondary, tertiary and other data. For example, with respect to the original table, after designating a column as primary, secondary, or so forth, the user may be presented with a list of display options to choose from that pre-format the display nests. Such display options may also assume a default display, and allow the user to change the default or customize the default. Such display selections would also be persistently stored with the data. It is also possible, for display options to be set at the display application side so the display options are used whenever a summary table of data with some form of column or row nesting designations is being displayed or otherwise presented.

As can be seen, implementations discussed herein may provide for primary designations of columns, and the subsequent display or use of the table data based on such primary designations, which designations may be provided by the user or through automatic designations based on characteristics of the table. Implementations may also allow for other designations and may allow for row aggregation. Display of the summary table data may then use the primary and other designations. Display of the summary table data may also consider the number and type of designated columns, the display size, and the number of nestlings and aggregations, among other factors.

Besides displaying information, the primary, secondary, and so forth, designations discussed herein may also be used to cause other actions, either alone or in conjunction with display organization. So, for example, a program may recognize the primary, etc., designations, and use the designations to sort table data. So, for example, a user selecting sort may act first on the primary column (or column) to sort. Additionally, even if columns and rows are designated, it is possible to view the original table data, such as through a user menu options, touch screen options, etc. Views may be previewed allowing a user to touch a view to cause that view to be displayed. For example, a user may be presented with both the original table and a summary table view, such as through a split screen view, and through a user selection, then display the original (full table) or the summary table with nested views.

Example embodiments described herein may be implemented at least in part in electronic circuitry; in computer hardware executing firmware and/or software instructions; and/or in combinations thereof. Example embodiments also may be implemented using a computer program product (e.g., a computer program tangibly or non-transitorily embodied in a machine-readable medium and including instructions for execution by, or to control the operation of, a data processing apparatus, such as, for example, one or more programmable processors or computers). A computer program may be written in any form of programming language, including compiled or interpreted languages, and may be deployed in any form, including as a stand-alone program or as a subroutine or other unit suitable for use in a computing environment. Also, a computer program can be deployed to be executed on one computer, or to be executed on multiple computers at one site or distributed across multiple sites and interconnected by a communication network.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a stand-alone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

Figure 6:
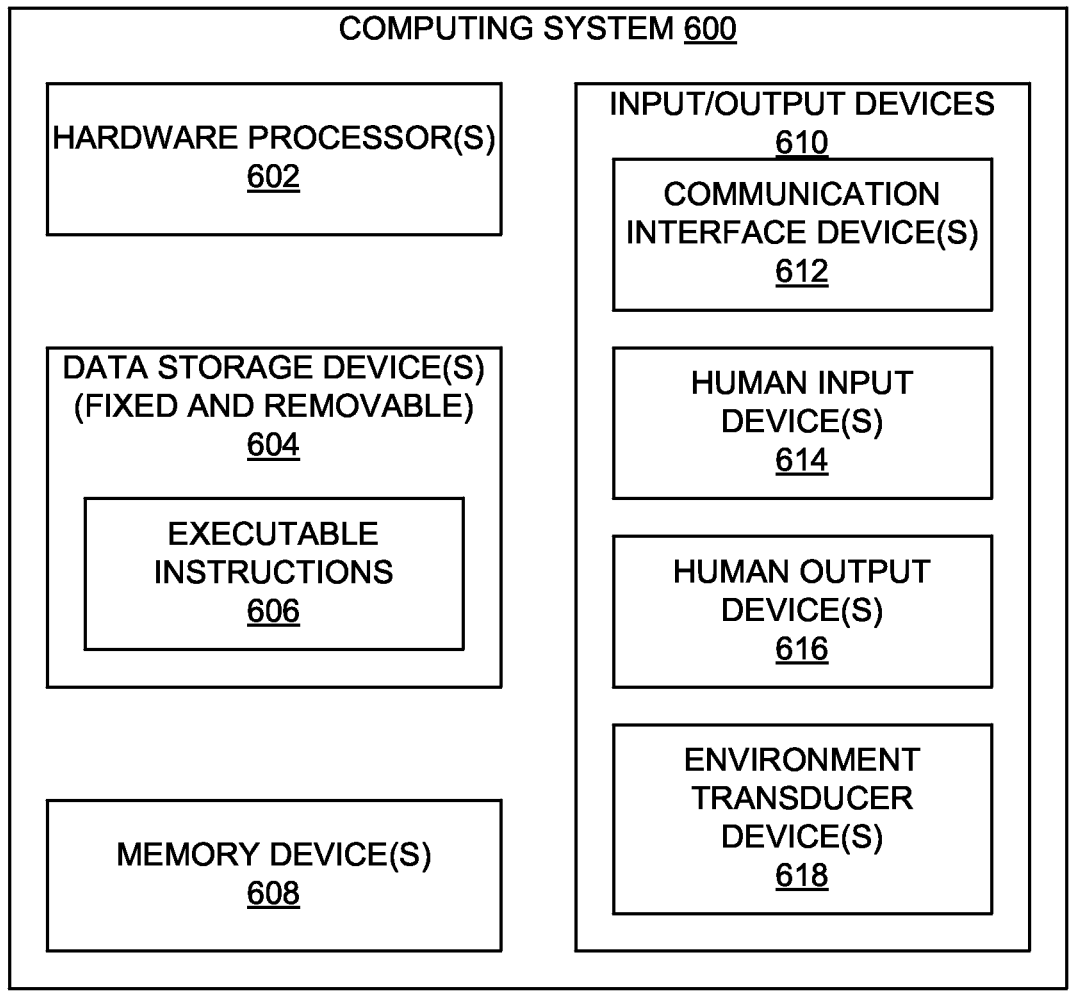
FIG. 6 is a first functional block diagram of an electronic device in accordance with some embodiments.

FIG. 6 is a block diagram of a machine in the example form of a computer system 600 within which instructions 606 for causing the machine to perform any one or more of the methodologies discussed herein may be executed by one or more hardware processors 602. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. In some examples, the machine may be a desktop computer, a laptop computer, a tablet computer, a television receiver or set-top box (STB), a video streaming device, a smart television, a smartphone, a gaming system, a web appliance, a communication network node (e.g., a network router, switch, or bridge), a computing system embedded within another device or system (e.g., a household appliance), or any machine capable of executing instructions 606 (sequential or otherwise) that specify actions to be taken by that machine. Further, while only a single machine is illustrated, the term "machine" shall also be taken to include any collection of machines that individually or jointly execute a set (or multiple sets) of instructions 606 to perform any one or more of the methodologies discussed herein such as, the methods set forth in FIG. 3 and FIG. 5, and/or the display and manipulation of data tables illustrated in FIGS. 2 and 4A-4C.

As depicted in FIG. 6, the example computing system 600 may include one or more hardware processors 602, one or more data storage devices 604, one or more memory devices 608, and/or one or more input/output devices 610. Each of these components may include one or more integrated circuits (ICs) (including, but not limited to, FPGAs, ASICs, and so on), as well as more discrete components, such as transistors, resistors, capacitors, inductors, transformers, and the like. Various ones of these components may communicate with one another by way of one or more communication buses, point-to-point communication paths, or other communication means not explicitly depicted in FIG. 6. Additionally, other devices or components, such as, for example, various peripheral controllers (e.g., an input/output controller, a memory controller, a data storage device controller, a graphics processing unit (GPU), and so on), a power supply, one or more ventilation fans, and an enclosure for encompassing the various components, may be included in the example computing system 600, but are not explicitly depicted in FIG. 6 or discussed further herein.

The at least one hardware processor 602 may include, for example, a central processing unit (CPU), a microprocessor, a microcontroller, and/or a digital signal processor (DSP). Further, one or more hardware processors 602 may include one or more execution cores capable of executing instructions and performing operations in parallel with each other.

The one or more data storage devices 604 may include any non-volatile data storage device capable of storing the executable instructions 606 and/or other data generated or employed within the example computing system 600. In some examples, the one or more data storage devices 604 may also include an operating system (OS) that manages the various components of the example computing system 600 and through which application programs or other software may be executed. Thus, in some embodiments, the executable instructions 606 may include instructions of both application programs and the operating system. Examples of the data storage devices 604 may include, but are not limited to, magnetic disk drives, optical disk drives, solid state drives (SSDs), flash drives, and so on, and may include either or both removable data storage media (e.g., Compact Disc Read-Only Memory (CD-ROM), Digital Versatile Disc Read-Only Memory (DVD-ROM), magneto-optical disks, flash drives, and so on) and non-removable data storage media (e.g., internal magnetic hard disks, SSDs, and so on).

The one or more memory devices 608 may include, in some examples, both volatile memory (such as, for example, dynamic random access memory (DRAM), static random access memory (SRAM), and so on), and non-volatile memory (e.g., read-only memory (ROM), flash memory, and the like). In one embodiment, a ROM may be utilized to store a basic input/output system (BIOS) to facilitate communication between an operating system and the various components of the example computing system 600. In some examples, DRAM and/or other rewritable memory devices may be employed to store portions of the executable instructions 606, as well as data accessed via the executable instructions 606, at least on a temporary basis. In some examples, one or more of the memory devices 608 may be located within the same integrated circuits as the one or more hardware processors 602 to facilitate more rapid access to the executable instructions 606 and/or data stored therein.

The one or more data storage devices 604 and/or the one or more memory devices 608 may be referred to as one or more machine-readable media, which may include a single medium or multiple media (e.g., a centralized or distributed database, and/or associated caches and servers) that store the one or more executable instructions 606 or data structures. The term "machine-readable medium" shall also be taken to include any tangible medium that is capable of storing, encoding, or carrying instructions 606 for execution by the machine and that cause the machine to perform any one or more of the methodologies of the present disclosure, or that is capable of storing, encoding, or carrying data structures utilized by or associated with such instructions 606.

The input/output devices 610 may include one or more communication interface devices 612, human input devices 614, human output devices 616, and environment transducer devices 618. The one or more communication interface devices 612 may be configured to transmit and/or receive information between the example computing system 600 and other machines or devices by way of one or more wired or wireless communication networks or connections. The information may include data that is provided as input to, or generated as output from, the example computing device 600, and/or may include at least a portion of the executable instructions 606. Examples of such network or connections may include, but are not limited to, Universal Serial Bus (USB), Ethernet, Wi-Fi®, Bluetooth®, Near Field Communication (NFC), Long-Term Evolution (LTE), and so on. One or more such communication interface devices 610 may be utilized to communicate one or more other machines, either directly over a point-to-point communication path, over a wide area network (WAN) (e.g., the Internet), over a local area network (WAN), over a cellular (e.g., third generation (3G) or fourth generation (4G)) network, or over another communication means. Further, one or more of one of wireless communication interface devices 612, as well as one or more environment transducer devices 618 described below, may employ an antenna for electromagnetic signal transmission and/or reception. In some examples, an antenna may be employed to receive Global Positioning System (GPS) data to facilitate determination of a location of the machine or another device.

In some embodiments, the one or more human input devices 614 may convert a human-generated signal, such as, for example, human voice, physical movement, physical touch or pressure, and the like, into electrical signals as input data for the example computing system 600. The human input devices 614 may include, for example, a keyboard, a mouse, a joystick, a camera, a microphone, a touch-sensitive display screen ("touchscreen"), a positional sensor, an orientation sensor, a gravitational sensor, an inertial sensor, an accelerometer, and/or the like.

The human output devices 616 may convert electrical signals into signals that may be sensed as output by a human, such as sound, light, and/or touch. The human output devices 616 may include, for example, a display monitor or touchscreen, a speaker, a tactile and/or haptic output device, and/or so on.

The one or more environment transducer devices 618 may include a device that converts one form of energy or signal into another, such as from an electrical signal generated within the example computing system 600 to another type of signal, and/or vice-versa. Further, the transducers 618 may be incorporated within the computing system 600, as illustrated in FIG. 6, or may be coupled thereto in a wired or wireless manner. In some embodiments, one or more environment transducer devices 618 may sense characteristics or aspects of an environment local to or remote from the example computing device 600, such as, for example, light, sound, temperature, pressure, magnetic field, electric field, chemical properties, physical movement, orientation, acceleration, gravity, and so on. Further, in some embodiments, one or more environment transducer devices 618 may generate signals to impose some effect on the environment either local to or remote from the example computing device 600, such as, for example, physical movement of some object (e.g., a mechanical actuator), heating or cooling of a substance, adding a chemical substance to a substance, and so on.

With the foregoing in mind, a general description is provided above of suitable electronic devices that may be used to implement the display of a table in an application and to allow definition of display designations, and subsequent summary table display that allow progressive revelation of nested designation and other operations to be performed on the table as discussed herein.

In certain embodiments, an input structure and display may be provided together, such as in the case of a touchscreen, where a touch sensitive mechanism is provided. In embodiments using a touchscreen, the user may select or interact with displayed interface elements (such as column or row elements of a displayed summary table) via the touch sensitive mechanism. In this way, the displayed interface may provide interactive functionality, allowing a user to navigate the displayed interface by touching the display.

With the foregoing in mind, some of the figures illustrate a handheld device, such as the tablet computer 112 or a smartphone 110. By way of example, the handheld device may be a model of an iPad®, iPod®, iPhone® or Apple Watch® available from Apple Inc. of Cupertino, Calif. It should be noted that while the depicted handheld device is provided in the context of a smartphone or tablet, other types of handheld devices (such as media players for playing music and/or video, personal data organizers, handheld game platforms, electronic books, handheld GPS navigation units, and/or combinations of such devices) may also be suitably provided. Further, a suitable handheld device may incorporate the functionality of one or more types of devices, such as a media player, a cellular phone, a gaming platform, an electronic book, a personal data organizer, and so forth.

Figure 7:
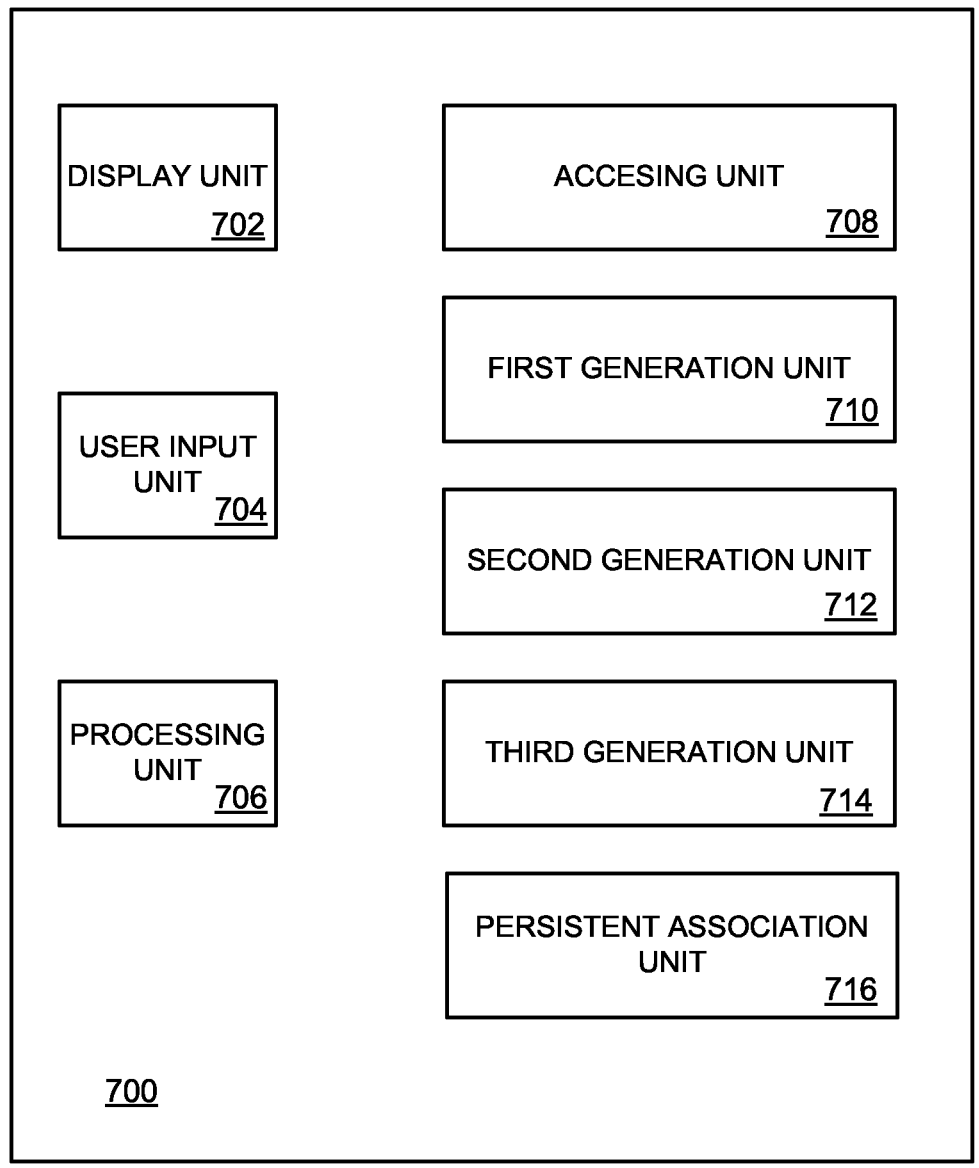
FIG. 7 is a second functional block diagram of an electronic device, in accordance with some embodiments, and including various operational units arranged to carry out various operations.
Figure 8:
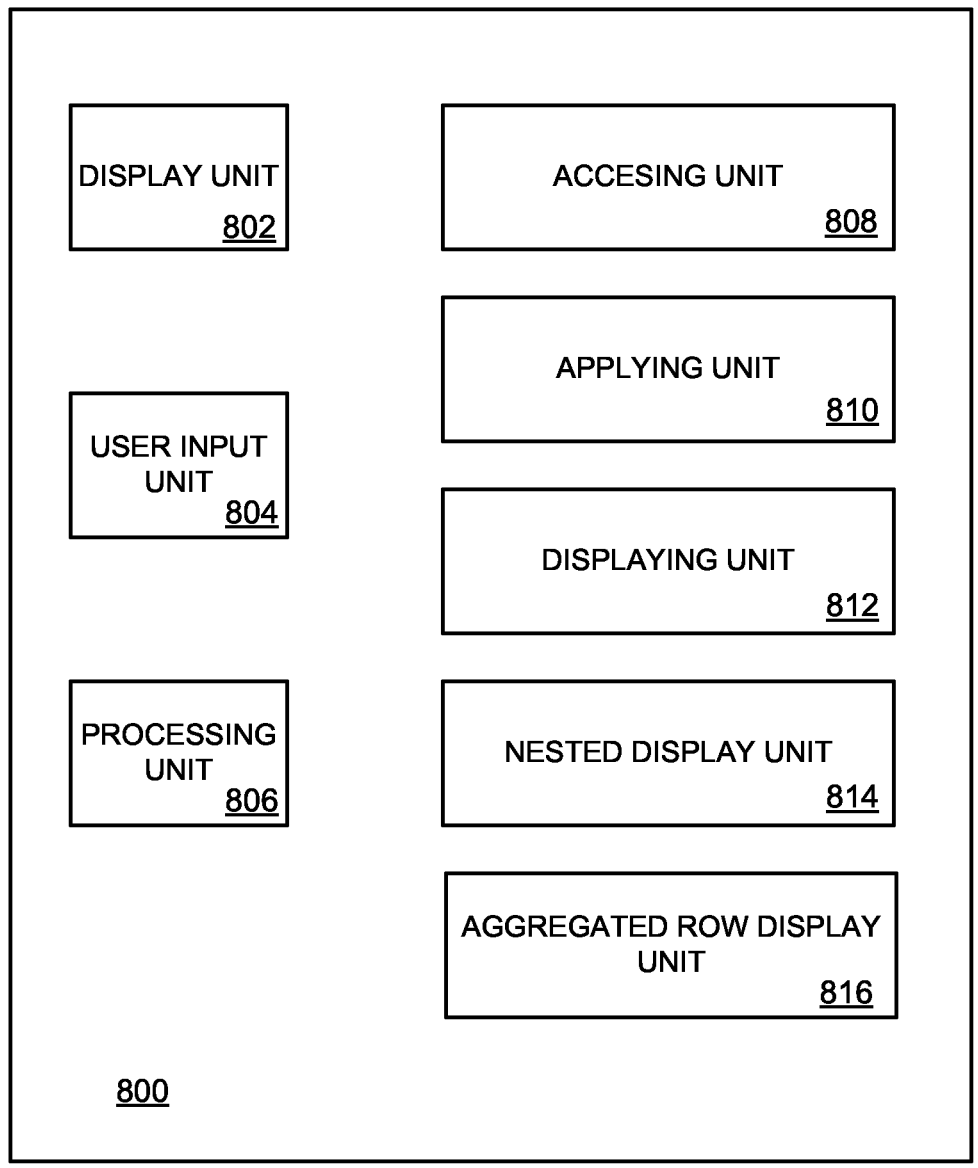
FIG. 8 is a third functional block diagram of an electronic device, in accordance with some embodiments, and including various operational units arranged to carry out various operations.

In accordance with some embodiments, FIG. 7 shows a functional block diagram of an electronic device 700 configured in accordance with the principles of the various described embodiments. The functional blocks of the device are, optionally, implemented by hardware, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, the electronic device 700 includes a display unit 702 configured to display a graphic user interface, optionally, a touch-sensitive surface unit 704 configured to receive contacts or a mouse, which may be a wireless mouse, and a processing unit 706 coupled to the display unit 702 and, optionally, the user input unit 704. The operations described above with reference to FIG. 3 are, optionally, implemented by components depicted in FIG. 6 or FIG. 8. For example, the processing unit 706 may include various units implementing operations of FIG. 3. More specifically, accessing operation 302 may be implemented by accessing unit 708, generating operation 304 may be implemented by first generating unit 710, generating operation 306 may be implemented by second generating unit 712, generating operation 306 may be implemented by third generating unit 714, and persistent association and storing operation 310 may be implemented by persistent association unit 716.

Similarly, the operations described above with reference to FIG. 5 are, optionally, implemented by components depicted in FIG. 7 or FIG. 9. The electronic device 800 includes a display unit 802 configured to display a graphic user interface, optionally, a touch-sensitive surface unit 804, such as a touch screen, configured to receive contacts and a processing unit 806 coupled to the display unit 802 and, optionally, the touch-sensitive surface unit 804. For example, accessing operation 502 may be implemented by accessing unit 808, applying operation 504 may be implemented by applying unit 810, displaying operation 506 may be implemented by display unit 812, nested display operation 308 may be implemented by nested display unit 814 and aggregated row operation 510 may be implemented by aggregated row display unit 816.

It should be understood that, although the terms first, second, etc. are, in some instances, used herein to describe various elements or operations, these elements should not be limited by these terms. These terms are only used to distinguish one element from another. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if (a stated condition or event) is detected" is, optionally, construed to mean "upon determining" or "in response to determining" or "upon detecting (the stated condition or event)" or "in response to detecting [the stated condition or event]," depending on the context.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A computer implemented method of presenting table data, the method comprising:
    in a computing device in operable communication with a display and in operable communication with at least one tangible, non-transitory data storage, accessing an original table, the original table organized as a plurality of rows and a plurality of columns with a plurality of cells corresponding to each intersection of one of the plurality of rows and one of the plurality of columns in each row of the plurality of rows, the plurality of columns comprising at least one primary column and at least one secondary column;
    displaying, in a graphical user interface presented on the display, a first view of a summary table, wherein the first view comprises the at least one primary column without the at least one secondary column;
    receiving, via the graphical user interface, a user input within a row of the summary table to display at least one secondary cell of the at least one secondary column that is not displayed in the first view, wherein the row of the summary table corresponds to a first row of the plurality of rows of the original table, wherein the at least one secondary cell corresponds to a cell of the original table located within the first row of the plurality of rows; and
    in response to the user input, displaying a second view of the summary table in the graphical user interface, wherein the second view comprises the at least one primary column and the at least one secondary cell nested within the at least one primary column.

2. The method of claim 1, wherein the summary table comprises a second plurality of rows, wherein each of the second plurality of rows is selectable to cause the at least one secondary cell to be displayed.

3. The method of claim 2, further comprising:
    receiving a second user input indicative of a selection of the at least one secondary cell; and
    in response to the second user input, displaying a third view of the summary table, wherein the third view comprises the at least one primary column, the at least one secondary cell, and at least one tertiary cell of a tertiary column of the plurality of columns of the original table, wherein the at least one tertiary cell is nested within the at least one primary column.

4. The method of claim 1, wherein the second view comprises:
    a first heading of the at least one primary column of the original table of data, wherein the first heading is located within the original table in a second row of the plurality of rows; and
    a second heading of the at least one secondary column, wherein:
        the second heading of the at least one secondary column is displayed adjacent to a primary cell included in the at least one primary column; and
        the second heading is located within the original table in the second row of the plurality of rows.

5. The method of claim 1, wherein the at least one primary column is designated as a primary column based on the at least one primary column being a header column of the original table.

6. The method of claim 1, further comprising receiving a second user input to display at least one primary cell of the at least one primary column that is not displayed in the first view due to being aggregated; and
    in response to the second user input, displaying the at least one primary cell in the at least one primary column.

7. The method of claim 6, further comprising:
    aggregating the at least one primary cell when the at least one primary cell is adjacent to another primary cell that includes a same data value as the at least one primary cell.

8. The method of claim 1, wherein the at least one primary column comprises two or more columns.

9. The method of claim 1, wherein the at least one secondary column is designated as a secondary column based on the at least one secondary column not being a header column.

10. The method of claim 1, further comprising aggregating into a display of a single row of the summary table, at least two rows of the original table associated with cells of a column having a common attribute.

11. An apparatus comprising:
a computing device with a touchscreen display, the computing device including at least one processor in operable communication with at least one tangible, non-transitory, memory including computer executable instructions to:
  access an original table or a summary table based on the original table, the original table organized as a plurality of rows and a plurality of columns with a plurality of cells corresponding to each intersection of one of the plurality of rows and one of the plurality of columns in each row of the plurality of rows, the plurality of columns comprising at least one primary column and at least one secondary column;
  display, in a graphical user interface presented on the touchscreen display, a first view of the summary table, wherein the first view comprises the at least one primary column without the at least one secondary column;
  receive, via the graphical user interface, a user input within a row of the summary table to display at least one secondary cell of the at least one secondary column that is not displayed in the first view, wherein the row of the summary table corresponds to a first row of the plurality of rows of the original table, wherein the at least one secondary cell corresponds to a cell of the original table located within the first row of the plurality of rows; and
  in response to the user input, display a second view of the summary table in the graphical user interface, wherein the second view comprises the at least one primary column and the at least one secondary cell nested within the at least one primary column.

12. The apparatus of claim 11, wherein the user input comprises a user interaction with the touchscreen display.

13. The apparatus of claim 11, wherein the computing device comprises a phone, a tablet computer, or a watch.

14. The apparatus of claim 11, wherein the computer executable instructions are further configured to aggregate at least two rows of the original table comprising cells of a column having a common attribute into a single row of the summary table.

15. A non-transitory computer-readable medium comprising instructions that, when executed by one or more processors, cause the one or more processors to:
  access an original table or a summary table based on the original table, the original table organized as a plurality of rows and a plurality of columns with a plurality of cells corresponding to each intersection of one of the plurality of rows and one of the plurality of columns in each row of the plurality of rows, the plurality of columns comprising at least one primary column and at least one secondary column;
  display, in a graphical user interface presented on a display, a first view of the summary table wherein the first view comprises the at least one primary column without the at least one secondary column;
  receive, via the graphical user interface, a user input within a row of the summary table to display at least one secondary cell of the at least one secondary column that is not displayed in the first view, wherein the row of the summary table corresponds to a first row of the plurality of rows of the original table, wherein the at least one secondary cell corresponds to a cell of the original table located within the first row of the plurality of rows; and
  in response to the user input, display a second view of the summary table in the graphical user interface, wherein the second view comprises the at least one primary column and the at least one secondary cell nested within the at least one primary column.

16. The non-transitory computer-readable medium of claim 15, wherein the instructions, when executed by the one or more processors, cause the one or more processors to:
  receive a second user input indicating a selection of at least one column of the plurality of columns of the original table; and
  designate the at least one column as the at least one primary column.

17. The non-transitory computer-readable medium of claim 15, wherein:
  the plurality of rows comprises, a second row directly beneath the first row and a third row directly beneath the second row; and
  the first view comprises cells of the first row and the third row that are included in the at least one primary column, wherein the cells of the first row and the third row that are included in the at least one primary column are adjacent to one another in the first view.

18. The non-transitory computer-readable medium of claim 17, wherein the instructions, when executed by the one or more processors, cause the one or more processors to:
  receive a second user input to display cells of the second row; and
  display the cells of the second row between the cells of the first row and the third row.

19. The non-transitory computer-readable medium of claim 15, wherein the instructions, when executed by the one or more processors, cause the one or more processors to automatically designate a first portion of the plurality of columns as the at least one primary column.

20. The non-transitory computer-readable medium of claim 19, wherein the instructions, when executed by the one or more processors, cause the one or more processors to automatically designate a second portion of the plurality of columns as the at least one secondary column based on the first portion of the plurality of columns being designated as the at least one primary column.

* * * * *